Oct. 31, 1944.　　J. D. FORBES　　2,361,540
PARACHUTE
Filed Aug. 31, 1943　　3 Sheets-Sheet 1
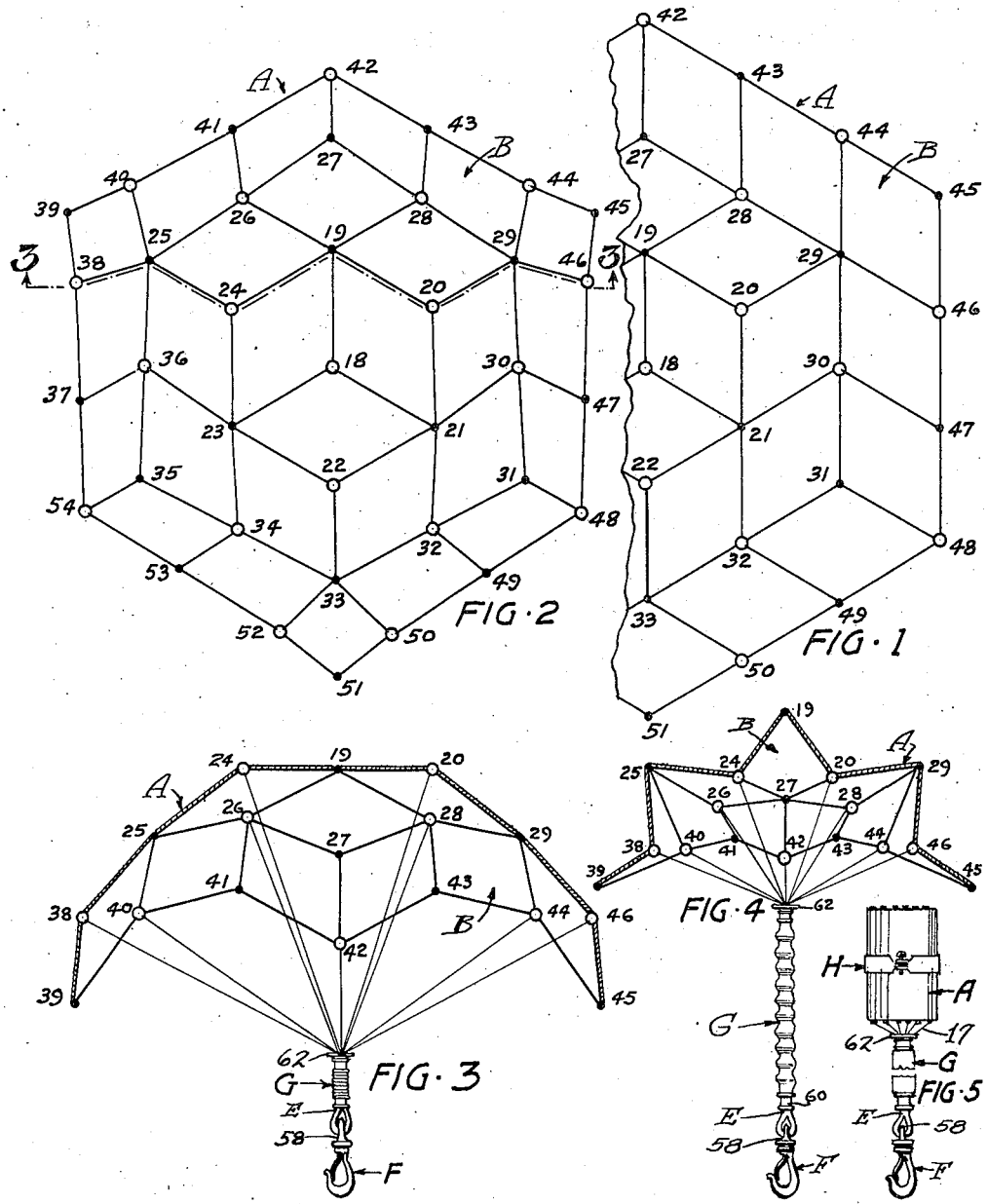
INVENTOR.
JOHN·D·FORBES.
BY
ATTORNEYS.

Oct. 31, 1944.　　　J. D. FORBES　　　2,361,540
PARACHUTE
Filed Aug. 31, 1943　　　3 Sheets-Sheet 2

INVENTOR.
JOHN D. FORBES.
BY
Munn, Liddy & Glaccum
ATTORNEYS.

Oct. 31, 1944.                J. D. FORBES                2,361,540
PARACHUTE
Filed Aug. 31, 1943        3 Sheets-Sheet 3

INVENTOR.
JOHN·D·FORBES.
BY
ATTORNEYS.

Patented Oct. 31, 1944

2,361,540

UNITED STATES PATENT OFFICE 2,361,540

PARACHUTE

John D. Forbes, San Francisco, Calif.

Application August 31, 1943, Serial No. 500,711

6 Claims. (Cl. 244—145)

An object of my invention is to provide a parachute which differs in the manner of folding it into a compact bundle from the parachute shown in my co-pending application, Serial No. 436,761, filed March 30, 1942. In the co-pending case I show a parachute composed of a plurality of diamond-shaped members, each being foldable in a particular manner. When the parachute is opened, the cords connected to the periphery of the body member extend to and support the object or person carried by the parachute.

In the present form of the invention, the body member is composed of diamond-shaped portions connected together and certain of the intersections of the portions have cords attached thereto and these cords extend to a common collapsible sleeve or tube that may be manipulated for collapsing all of the parachute portions in a predetermined manner for folding the parachute into a compact bundle. When the body of the parachute is fully opened it will be in the shape of a hemisphere. The cords are wound together in a particular way to form the final cable.

The device not only can be folded into a compact bundle more expeditiously than that shown in my co-pending application, but the parachute will offer a greater support because the cords are connected to different portions throughout the entire area of the hemisphere rather than to only the periphery of the parachute.

The device is simple in construction and is so designed that it will automatically open when the cords are freed.

Other objects and advantages will appear in the following specification, and the novel features of the device will be particularly pointed out in the appended claims.

My invention is illustrated in the accompanying drawings forming a part of this application, in which:

Figure 1 is a diagrammatic plan view of a portion of the parachute showing it laid out flat;

Figure 2 is a diagrammatic top plan view of the parachute as it appears when it is in the shape of a hemisphere;

Figure 3 is a diagrammatic transverse section taken along the line 3—3 of Figure 2;

Figure 4 is a diagrammatic transverse sectional view similar to Figure 3 but showing the parachute partly closed;

Figure 5 is a diagrammatic view showing the parachute entirely closed;

While I have shown only the preferred form of my invention, it should be understood that various changes or modifications may be made within the scope of the appended claims without departing from the spirit and scope of the invention.

In carrying out my invention I illustrate in Figures 1 and 2 a plan view of a parachute indicated generally at A. This parachute is formed from a plurality of diamond-shaped units B and it is best to describe one of these units and to show how it is connected to adjacent units before explaining how the parachute can be opened or closed.

Figure 6:
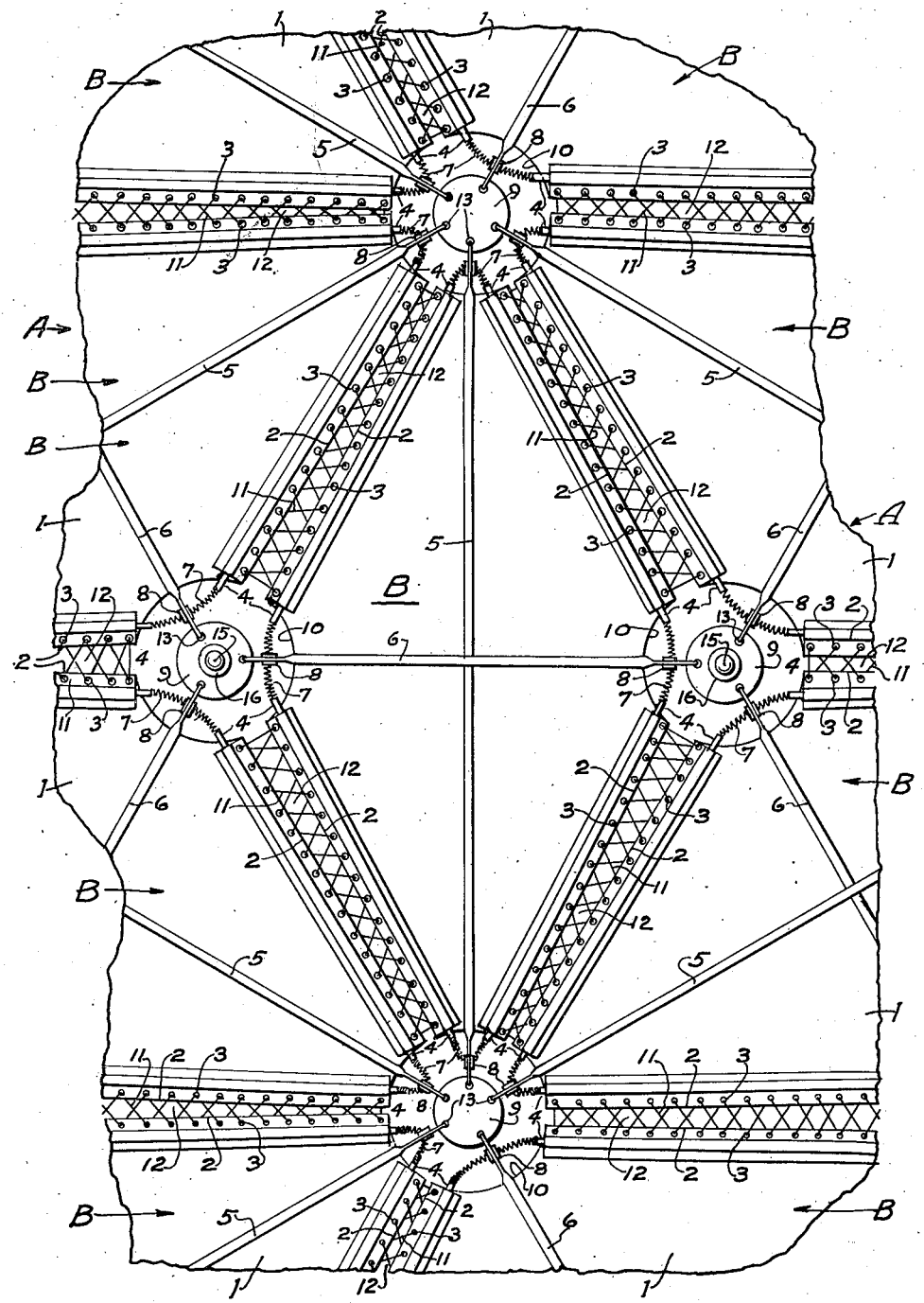
Figure 6 is a detailed enlarged plan view of one of the diamond-shaped portions and associate portions illustrating how they are formed and connected together.

One of the units B is shown in detail in Figure 6 and this figure corresponds to Figure 3 of the Patent Office drawings shown in my co-pending application, Serial Number 436,761. Since the unit has been disclosed in the co-pending case, only a brief description need be given. The unit B is formed of a piece of cloth 1, and the edges of the cloth are folded back on themselves as at 2. Eyelets 3 are disposed along the folded edges and then the folded back portions enclose rods 4. The folded back portions are stitched (not shown) for holding the rods in place.

The result is a unit B in the shape of a diamond with its four edges held in a rigid manner by the rods. If desired, the diamond-shaped unit may be reinforced by tapes 5 and 6 that extend along the major and minor axes of the diamond. Figure 6 shows a number of diamond-shaped units interconnected in a manner not to be described. The rods 4 of each diamond have their ends connected together by coil springs 7. The springs pass through rings 8 around which the ends of the tapes 5 and 6 are wound. The ends of the tapes 5 and 6 are then extended beyond the rings and are secured to discs 9. It will be noted that at the juncture of the vertices of adjacent diamond-shaped units B, the cloth 1 is cut away to form circular openings 10. The discs 9 are centrally disposed in the openings.

The adjacent units B are connected together by lacing 11 that is passed through the eyelets 3, see Figure 6. The lacing does not bind the edges 4 so that they will abut one another, but leaves a space or slot 12 between the edges. I have found that air can pass through the spaces or slots 12 and through the openings 10 to maintain the parachute in even flight as it descends through the air. The openings are not large enough to cause the parachute to drop too rapidly but aid in keeping it on an even keel. The coil springs 7 open the parachute instantly when the parachute is freed. This has been explained in my co-pending application above referred to.

Figure 8:
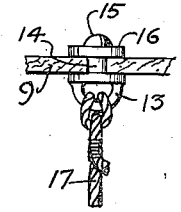
Figure 8 is a view showing how the cords are connected to the parachute.

Figure 8 shows the disc 9 provided with a centrally disposed eyelet 13. This eyelet is held in place by an integral rivet 14 that has its end 15 upset and bearing against a washer 16. A cord 17 is secured to the eyelet by a clove hitch or any other suitable type of knot. In Figures 1 and 2 I have numbered the points of intersection of the units B from 18 to 54 inclusive. The cords 17 are attached to the even numbered points of intersection as indicated by the small circles in Figures 1 to 4 inclusive. I have found the best practice in wrapping the cords together to arrange them first in groups of threes. The cords extend from spaced points over the entire inner surface of the parachute.

Figure 7:
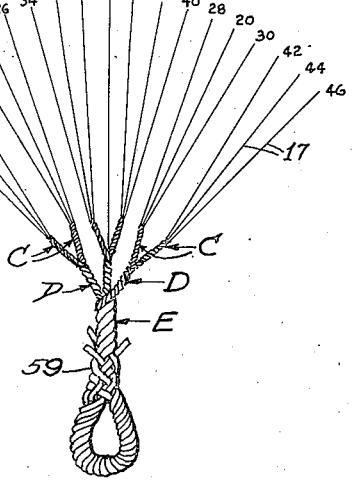
Figure 7 is a schematic view illustrating how the cords are wrapped into groups, the groups into strands and the strands into a cable.

In Figure 7 I illustrate how the cords are grouped. The cord leading from the center intersection 18 is in addition to the cord groupings of three in each group. I have numbered the cord outer ends in Figure 7 according to their position of attachment to the parachute, and illustrate how the cords in groups of three are wound as indicated at C. The groups of three cords each are right-hand rope wound. I then take two groups C and wind them into strands indicated at D. The two groups forming a single strand are left-hand wound. The three resulting strands D are then wound into the completed cable E.

Figures 9, 10:
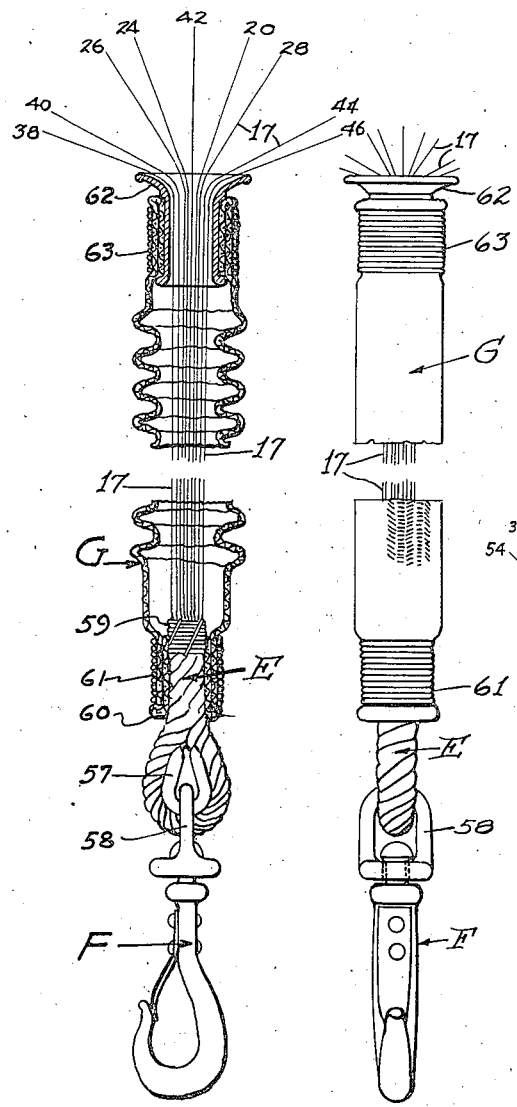
Figure 9 is a vertical section through the sleeve or tube that encloses the cable and cords.
Figure 10 is a side elevation of Figure 9.

The cable E is shown in Figures 9 and 10. The free end of the cable is bent around a thimble 57 and passed through the eye 58 of a swivel hook F. The cable is then eye-spliced to itself as shown at 59 in Figure 7.

A sleeve G has one end 60 whipped to the cable as at 61, see Figure 9. The other end of the sleeve or tube is whipped to a reefing collar 62 at 63. The sleeve G is made of a flexible material such as a knit material and is collapsible along the cable E and cords for a purpose now to be described.

From the foregoing description of the various parts of the device, the operation thereof may be readily understood.

The radial cords 17 extend to the cable E and form the cable in the manner already disclosed. The cords connect to different portions of the parachute interior. When the parachute is fully closed, it will assume the compact position shown at A in Figure 5. A strap H or casing holds the chute in collapsed condition. The sleeve or tube G is fully extended when the parachute is collapsed. When the parachute is to be opened, the strap H is freed from the parachute by the parachute release shown in my co-pending application Serial No. 498,134, filed August 10, 1943, or by any other means for accomplishing this same purpose.

The instant the strap H is freed from the parachute, the springs 7 will open all of the diamond-shaped units B and cause the parachute to assume the position shown in Figure 4. It is possible for the parachutist to hold the collar 62 in the position shown in Figure 4 and thus maintain the parachute in half-opened position. A more effective braking action is obtained when the parachute is held partly open. A movement of the collar 62 toward the end 60 will slide the collar along the cord lengths to permit the cords to spread and the parachute to take the shape of a hemisphere. When the parachute is fully opened it will appear as illustrated in Figure 3. The sleeve or tube G will be fully collapsed in this instance.

Any number of concentrically arranged, diamond-shaped sections B may be added to the parachute to make it as large as desired. The collapsible knitted tube G surrounding the extremities of the radial cords 17, prevent these cords from tangling when the parachute is folded. Also the tube controls the opening of the parachute when the strap H is freed from the folded parachute. The top of the hemispherical parachute may be flattened so that the center ring of diamond-shaped sections will all lie in the same plane.

I claim:

1. A parachute comprising a flexible body member composed of a plurality of interconnected diamond-shaped portions, said body when fully expanded being hemispherical in shape, and a plurality of cords connected to certain of the diamond-shaped portions at points where they connect with adjacent diamond-shaped portions, said cords having their free ends wound into a cable for supporting an object when the parachute is open.

2. A parachute comprising a flexible body member composed of a plurality of interconnected diamond-shaped portions, said body when fully expanded being hemi-spherical in shape, and a plurality of cords connected to certain of the diamond-shaped portions at points where they connect with adjacent diamond-shaped portions, said cords having their free ends wound into a cable for supporting an object when the parachute is open, an extensible sleeve enclosing the cable and being manually elongated to receive portions of the cords for limiting the amount of opening of the parachute.

3. A parachute comprising a flexible body member composed of a plurality of interconnected diamond-shaped portions, spring means placed at the junctures of the diamond-shaped portions for yieldingly urging the parachute into a hemi-spherical shape, a plurality of cords connected to certain of the diamond-shaped portions, at points where they connect with adjacent diamond-shaped portions, said cords having their free ends wound into a cable, and an extensible sleeve enclosing the cable and being manually elongated to move onto the cord portions and partially collapse the opened parachute.

4. A parachute comprising a flexible body member composed of a plurality of interconnected diamond-shaped portions, spring means placed at the junctures of the diamond-shaped portions for yieldingly urging the parachute into a hemi-spherical shape, said diamond-shaped portions being interconnected by tapes connected to the portions and to discs placed at the junctures, and a plurality of cords connected to certain of the discs, said cords having their free ends wound into a cable for supporting an object when the parachute is open.

5. A parachute comprising a flexible body member composed of a plurality of interconnected diamond-shaped portions, spring means placed at the junctures of the diamond-shaped portions for yieldingly urging the parachute into a hemi-spherical shape, said diamond-shaped portions being interconnected by tapes connected to the portions and to discs placed at the junctures, and a plurality of cords connected to certain of the discs, said cords having their free ends wound into a cable for supporting an object when the parachute is open, a collapsible sleeve mounted on the cable and being manually extensible to receive portions of the cords, the cord connections with the discs being such that a foreshortening of the cables will pull the cord connected discs out of the hemispherical plane of the parachute to aid in the folding of the parachute.

6. A parachute comprising a semi-flexible body member composed of a plurality of diamond-shaped portions, rods bounding the edges of each portion, springs connecting the adjacent rod ends together for urging them into a position to open the portion, discs placed at the junctures of the portions with each other and having the tapes secured thereto, cords connected to certain of said discs and having their free ends wound into a cable, and a collapsible sleeve enclosing the cable and being manually extended along the cords for causing the latter to draw their attached discs inwardly out of the hemispherical plane formed by the open parachute, the inward drawing of the certain discs causing the parachute to be folded into a compact bundle.

JOHN D. FORBES.